United States Patent [19]

Larsen

[11] 4,152,479
[45] * May 1, 1979

[54] METHOD OF ORIENTING SHEET PLASTIC NET AND ARTICLE PRODUCED THEREFROM

[75] Inventor: Ronald L. Larsen, Minneapolis, Minn.

[73] Assignee: Conwed Corporation, St. Paul, Minn.

[*] Notice: The portion of the term of this patent subsequent to Feb. 1, 1992, has been disclaimed.

[21] Appl. No.: 653,541

[22] Filed: Jan. 29, 1976

Related U.S. Application Data

[63] Continuation of Ser. No. 697,492, Jan. 12, 1968, abandoned.

[51] Int. Cl.² .............................................. B32B 3/10
[52] U.S. Cl. ................................... 428/224; 156/229; 156/244.15; 264/DIG. 81; 264/167; 264/289; 428/255; 428/910
[58] Field of Search ............................ 156/229, 244; 264/DIG. 81, 177 F, 210 F, 289; 428/224, 255

[56] References Cited

U.S. PATENT DOCUMENTS

| | | | |
|---|---|---|---|
| 2,361,369 | 10/1944 | Grebe et al. | 264/146 |
| 2,919,467 | 1/1960 | Mercer | 264/167 X |
| 3,051,987 | 9/1962 | Mercer | 264/103 |
| 3,070,840 | 1/1963 | Mercer | 264/171 X |
| 3,222,440 | 12/1965 | Murphy | 264/167 |
| 3,252,181 | 5/1966 | Hureau | 156/500 X |
| 3,276,942 | 10/1966 | Ewing | 428/134 X |
| 3,315,283 | 4/1967 | Larsen | 5/354 |
| 3,317,951 | 5/1967 | Hureau | 425/71 X |
| 3,365,352 | 1/1968 | Van Burleigh et al. | 428/135 |
| 3,384,692 | 5/1968 | Galt et al. | 264/167 |
| 3,386,876 | 6/1968 | Wyckoff | 428/134 |
| 3,444,588 | 5/1969 | Martin et al. | 264/167 X |
| 3,554,853 | 1/1971 | Mercer et al. | 428/134 |
| 3,557,268 | 1/1971 | Beretta et al. | 264/145 |

FOREIGN PATENT DOCUMENTS

836555 6/1960 United Kingdom ............ 264/DIG. 81

*Primary Examiner*—Henry F. Epstein
*Attorney, Agent, or Firm*—Eyre, Mann, Lucas & Just

[57] ABSTRACT

An extruded thermoplastic netting having two sets of strands, which sets cross each other at substantially a right angle, is molecularly oriented first along one set of strands and then along the other set to achieve improved heat stability as compared to previous simultaneous orientation of the sets of strands and under conditions to minimize webbing at the joints.

6 Claims, 7 Drawing Figures

METHOD OF ORIENTING SHEET PLASTIC NET AND ARTICLE PRODUCED THEREFROM

This is a continuation, of application Ser. No. 697,492, filed Jan. 12, 1968, now abandoned.

This invention relates to the molecular orientation of the polymeric molecules in the strands of a thermoplastic net made up of at least two sets of such strands.

More particularly, this invention relates to the orientation of such a net in which the strands of one set cross the strands of another set at substantially a right angle.

Still more specifically, this invention contemplates the use of a means of orienting the strands of one set independly of the orientation of the strands of another set to achieve unexpected final product properties.

By use of the method of this invention, not only are unexpected and improved product properties achieved, notably improved heat stability, but also considerable process flexibility is achieved permitting greater variety of products and greater variety and control of the degree of orientation. This is particularly so in that the degree of orientation of one set of strands may be totally independently controlled with respect to the degree of orientation of the other set of strands.

Additionally, it has been discovered that great decrease in strength is experienced if there is any noticeable "webbing" at the joints and that such webbing can be minimized by careful control of the orienting conditions.

These and other advantages will be evident to those experienced in the art from the following specification and drawings in which:

FIG. 4 is an enlarged view of one of the joints of the net of FIG. 3, and FIGS. 5, 6, and 7 show different degrees of webbing of the joints.

In relatively recent years, various methods and apparatus have been discovered for the extrusion of thermoplastic net-like structures in a continuous manner. Examples of such extrusion processes and apparatus are shown in the U.S. Pat. No. 2,919,467 to Mercer and the U.S. Pat. No. 3,252,181 to Hureau. Each of these patents discloses apparatus and a method for continuously extruding a plurality of sets of strands in such a manner that the strands of one set cross the strands of another set, thus producing a mesh-like or net-like material. Preferentially, such nets are extruded in tubular form.

These nets have found a number of uses in commerce as indicated in the above mentioned patents. For a number of these uses, it has also been found that it is advantageous to orient the molecules of these nets generally in the direction of the strands, thus providing increased strength per unit weight.

In one method of orienting in the tubular stage, as is presently done commercially, the extruded tubular net is heated by fluid, air or liquid after extrusion, and pulled by rolls. The pulling rolls are operated to pull the net at a rate faster than it is extruded. This results, with application of suitable degree of heat, in simultaneous orientation of the molecules in all sets of strands since all sets of strands are gripped by the pulling rollers.

While this method has certain economics, it is not useful when the strands of the net are at or close to a right angle since the pulling rollers must grip all sets of strands. This can be accomplished only when the angle between sets of strands places all strands of all sets in or close to the same linear direction as occurs, for example, in the net with diamond-shaped openings produced as disclosed in U.S. Pat. No. 2,919,467.

Another method that is useful in orienting nets having their sets of strands at any angle including, particularly, a right angle, is to heat such net when in tubular form and pull it over a mandrel with pulling rollers, as disclosed in the U.S. Pat. No. 3,317,951 to Hureau.

While this latter type of orientation has certain advantages, there are inherent difficulties. For example, it is difficult to insure even stretching and orientation around a mandrel while the tubular net is being pulled in one direction and the mandrel is forcing the net in a transverse direction, since friction upon the mandrel cannot possibly be even at all points around the mandrel. Additionally, there are practical limitations to the size of the mandrel, thus limiting as a practical matter the degree of transverse orientation of the strands.

The difficulties are particularly evident when one considers net in which the sets of strands are arranged at substantially right angles to each other. In attempting to draw such a tubular net over a mandrel, only the longitudinal sets of strands are grasped and pulled by rollers while the transverse set of strands are stretched and oriented solely by being forced over the frustro-conical mandrel. This latter disadvantage is not quite so apparent in nets in which the sets of strands, though arranged at an angle to each other, are arranged at such an angle as to produce substantially a diamond-shaped opening and all of the sets of strands are thus grasped by the pulling rollers and, consequently, are pulled thereby.

According to the present invention, the net-like tubes of plastic material are first slit longitudinally to produce sheets and then the sheets are oriented. Of particular importance is the fact that when orienting such sheets of plastic net, one set of strands is first oriented and then the second set of strands is oriented independently.

It has been found that by this separate and independent orientation of the separate sets of strands, unexpected, advantageous improvements in properties are achieved. Among these advantages is the heat stability of the net after orientation and cooling.

Generally, the sheet of plastic net is heated at least to a temperature at which the molecules of the particular polymer may be oriented by stretching. One set of strands only is then stretched while heated. After completion of this orientation-stretching, while heated, the net may or may not be cooled slightly depending upon the design of the equipment employed. If cooled, the net is then again heated at least to a temperature suitable to permit the orientation of the molecules of the particular polymer. While so heated or when so heated, the second set of strands only is stretched to orient the molecules. Finally, the net is cooled.

The particular temperatures employed will depend upon a number of variables and must be determined empirically for each set of circumstances. It is generally considered that orientation of the molecules of a thermoplastic can take place at the second transition point; however, for practical, commercial operation, the required temperature may be considerably higher. The second transition point for polypropylene, for example, is approximately room temperature, and orientation can be carried out very slowly at this temperature; however, as a practical matter, quantity commercial operation is carried out at temperatures generally in the range of 200° F.–325° F.

The strands of the polymeric plastic, when oriented in the direction of the strands, are thus rendered normally stretch-resistant. When suitably heated, the plastic exercises a memory and tends to return toward initial form. It is known that it is possible to relieve the stresses of orientation, and thus decrease the memory tending to return the strands to the initial form, by heat-setting the plastic just prior to the final cooling. Such heat-setting against memory return can be accomplished by heating to a predetermined temperature higher than the stretching temperatures employed. Accordingly, if it is desired to heat-set the material, such heat-setting is accomplished after the final stretching and orientation. After heat-setting, the net is finally cooled to room temperature.

Figure 1:
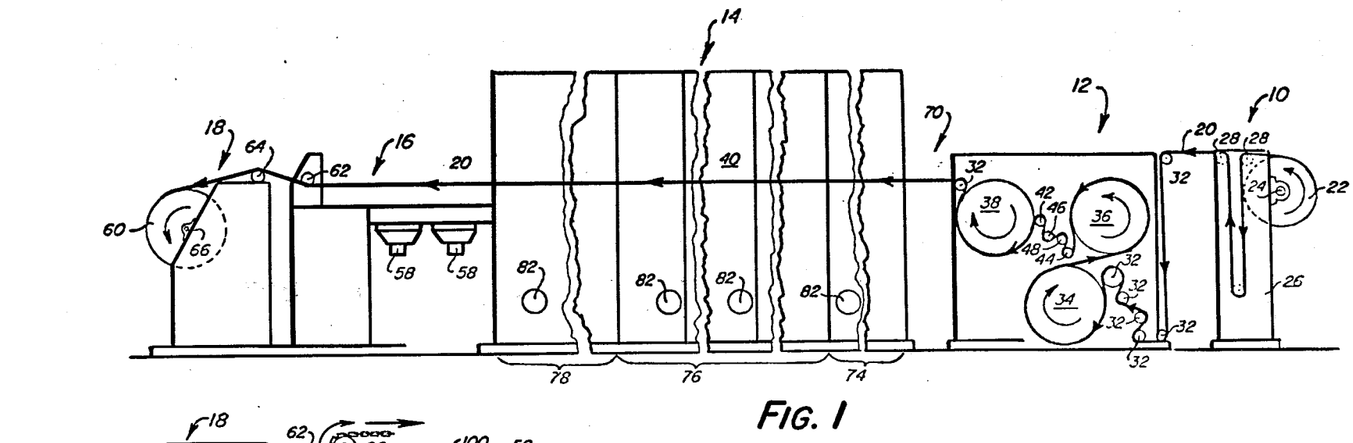
FIG. 1 is a diagramatic presentation in side elevation of the apparatus for carrying out the process of this invention.

Having reference now to the drawings which show my preferred method or orientation, FIG. 1 shows schematically the orienting device as comprising a roll holder 10 for holding the infeed roll 22 of the extruded net 20. Reading from right to left in FIG. 1, the successive elements of the device, after the rolling mechanism 10, are the drafting mechanism 12, the oven tentering mechanism 14, the cooling mechanism 16, and the takeup mechanism 18. The roll 22 of net material is removably journaled at 24 in the frame 26 which also supports various idler rolls 28. The net 20 is fed from the roll 22 around the idler rolls 28 and into the drafting mechanism 12 which comprises a frame supporting various idler rolls 32 and three large heated rolls 34, 36, and 38. Disposed between the two large heated rolls 36 and 38 is a set of four rolls comprising two idler rolls 42 and 44 and two drafting rolls 46 and 48.

Figure 2:
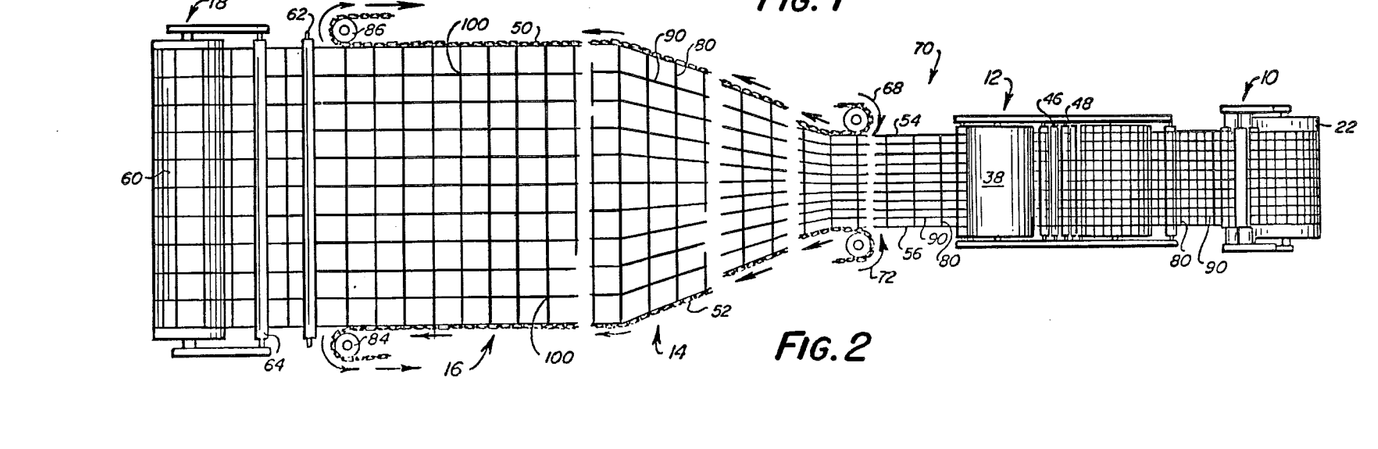
FIG. 2 is a diagramatic presentation in top plan view of the apparatus of FIG. 1 with the oven shown in FIG. 1 being removed for clarity.

After exiting from the drafting section 12 and the various rolls supported therein, the net is transported to and through a tentering mechanism 14 comprised of an oven 40 and two spaced, horizontally-disposed, endless chain members 50 and 52 (see FIG. 2). The endless chain members 50 and 52 have suitable grippers (not shown) thereon for gripping the edges 54 and 56, respectively, of the net 20 for transporting the same through the oven 40 and for pulling the net laterally as hereinafter described.

After issuing from the tentering mechanism 14, the net is carried by the endless belts 50-52 over a cooling section 16 comprised of one or a plurality of blowers 58 which blow cooling air through the net 20. After leaving the cooling section 16, the net 20 passes over suitable idler rolls as illustrated, for example, by rolls 62 and 64, and is taken up on the roll 60 of the take-up section 18. The roll 60 is formed on a shaft 66 which is suitably driven by a mechanism not shown to take up the net 20.

It is to be understood that various idler rolls are used and that those shown are for illustrative purposes only since requirements of space and equipment may require different paths of travel for the net 20. Generally, the rolls 34, 36, 38, 46, and 48 as well as shaft 66 are driven at suitable speeds as hereinafter described to convey the net 20 through the device. The endless chains 50 and 52 are also suitably driven in the direction shown by the arrows 68 and 72, respectively. The other rolls shown in the device are generally idler rolls and need not driven except to remove tension or friction from the net and, if driven, are driven at the speed of the net at the point where such net contacts any such given roll. The linear speed of the net 20 through the device is, however, not constant as will now be described.

The driven rolls 34, 36, and 48 are driven at such speeds of rotation that their peripheral speeds are the same. The rolls 38 and 46, however, are driven at a peripheral speed greater than that of the rolls 34, 36, and 48. Generally, the peripheral speed of the rolls 34, 36, and 48 is the same as the linear speed of the net 20 as it leaves the roll 22 and passes over the various idler rolls to and through the rolls 34, 36, and 48.

The rolls 38 and 46 are driven at the same peripheral speed, which speed is that of the net 20 as it passes over such rolls and through the remainder of the apparatus including the tentering mechanism 40, the cooling mechanism 16, and the take-up mechanism 18.

It will be seen that since the rolls 46 and 38 operate at a higher peripheral speed than the rolls 34, 36, and 48, the net 20, if properly heated, will stretch longitudinally in the space between the rolls 46 and 48 due to the difference in speed of these two rolls. The rolls 42 and 44 may also be driven, if desired, with the roll 42 driven at the same peripheral speed as rolls 38 and 46 and roll 44 being driven at the same peripheral speed as rolls 34, 36, and 48.

The rolls 34 and 36 are heated to such temperature as may be required by the circumstances of the particular orientation mechanism and the particular resin composition of the net 20. For certain polypropylene resins, it has been found that a suitable temperature for these rolls is in the range of from 200° F. to 300° F. The means for heating these rolls may include the use of water, oil, or other liquid, heated and pumped through such rolls, such means not being shown since many such mechanisms are known.

The roll 38 is likewise heated but to a lesser temperature than the rolls 34 and 36 to set the resin of the net 20 in order to permit its handling and passage from the roll 38 over the area generally indicated by the reference character 70 and into the tentering mechanism 14 where the net 20 is gripped by the endless chains 50 and 52. It will be seen that in the area 70, the net 20 is substantially unsupported and, as such, must have some self-supporting strength. Accordingly, the roll 38 is not as hot as the rolls 34 and 36 in order that the net 20 may be slightly cooled to set the resin, thus permitting transfer across the space 70. If the oven 40 of the tentering mechanism 14 extended across the space 70 and even somewhat over the area of the drafting mechanism 12, and if the supporting chains 50 and 52 extended very close to the heated roll 38, then, in that event, the cooling of the net would not be necessary since the space 70 would be closed up and the net would be supported in its passage from the roll 38 into the tentering mechanism 14. In the embodiment shown, however, this is not so and, as such, the roll 38 is slightly cooler than the rolls 34 and 36 in order to set the resin to give the net suitable strength for passage over this open area 70. Additionally, of course, there is some cooling inherent in the passage through this area 70.

As indicated above, the net 20 is extended in length and thus stretch-oriented in its passage through the drafting mechanism 20, such stretching taking place between rolls 46 and 48 by virtue of the different peripheral speeds of the rolls 46 and 48 and the heated condition of the net at the time it passes over and between these rolls. This is shown diagramatically in FIG.

2 in which the net 20 is shown as consisting of transverse strands 80 and longitudinal strands 90. As best shown in the area between the infeed holding mechanism 10 and the drafting mechanism 12 in FIG. 2, it will be seen that the transverse strands 80 and the longitudinal strands 90 define open mesh areas in the net 20 which are substantially square in the embodiment shown. After having passed through the drafting mechanism 12 the longitudinal strands 90 have been stretched to substantially three times their original length but the transverse strands 80 have remained at their original length as best shown in the area 70 in FIG. 2.

The tentering mechanism 14 includes the oven 40 containing generally three sections as indicated by the reference characters 74, 76, and 78. These sections of the oven 40 are heated by any suitable means including, for example, a hot gas blowing mechanism, such as indicated at 82. Generally, the section 74 is a preheating section, section 76 is a tentering section kept at a higher temperature than 74, and section 78 is a heat-setting section kept at still a higher temperature. For a typical polypropylene resin, the various sections 74, 76, and 78 are kept at a temperature in the range of from 200° F. to 325° F.

Upon entering the tentering mechanism 14, the net 20 is gripped on its edges 54 and 56 by suitable grippers (not shown) on the endless chains 50 and 52, respectively. The endless chains 50-52 are arranged in a suitable track (not shown) which guides such chains 50-52 initially along two parallel straight paths in the section 74 of the oven and then along diverging paths in the section 76 of the oven as shown in FIG. 2, and then again along parallel straight paths in section 78 of the oven. The paths of the chains 50-52 in section 78 are more widely spaced than in section 74.

The endless chains 50-52 carry the net 20 through and out of the oven 40 and then over the blowers 58 which blow room temperature air through the net to cool the same to or close to room temperature. At or near the point where the chains 50 and 52 are trained around the sprockets 84 and 86, respectively, the net 20 is released from the grippers of the chains 50 and 52 and is then taken up by the roller 60 driven by the driving shaft 66.

By reference to FIG. 2 of the drawing, it will be seen that during the passage of the net 20 through the section 76 of the oven, the transverse strands 80 are stretched in length since the chains 50 and 52 are diverging during this point of their travel. In the embodiment shown, the strands 80 are stretched to approximately three times their original length. At the same time, the longitudinal strands 90 are not increased in length but retain the length given to them during travel through the drafting device 12. This is evident from FIG. 2 when one compares the net 20 as shown in the area 70 to the net as shown after having passed through the section 76 of the oven. At the point 70, the transverse and longitudinal strands 80 and 90, respectively, define relatively elongated rectangles elongated in the direction of travel of the net. As shown after having issued from the section 76 of the oven, however, the strands 80 and 90 are shown as defining relatively large square openings in the net 20 of the same shape but of different dimension as compared with the original net 20 as it issued from the roll 22.

It is not necessary, of course, that the net 20 start out with square openings which are then transformed to elongated rectangles and then finally to larger square openings, such having been shown merely for clarity of illustration in the drawings. It is only necessary that the transverse strands 80 and the longitudinal strands 90 be arranged substantially at right angles to each other since the passage through the device creates pulling and stretching of the net first in one rectilinear direction in the drafting mechanism 12 and secondly in a right angular transverse direction in the tentering mechanism 14.

However, as indicated below, it is important for strength that there be no webbing in the angle of the joint formed by the crossing of a strand of one set with the strand of the other set. As such, careful control of the drafting and tentering temperatures and the speeds of operation are required. When the net 20 starts out with openings that are other than square, it is difficult to avoid such webbing, and with certain mats and certain angles of crossings it is nearly impossible to avoid such webbing in the orienting process. Consequently, it is much preferred to start with netting in which the openings are square.

As indicated above, the preferred embodiment contemplates the use of net as extruded by the method and apparatus disclosed in the U.S. Pat. No. 3,252,181 to Hureau in which the joint created by the crossing of a transverse strand 80 with a longitudinal strand 90 is integral with the strands 80 and 90 forming the crossing.

It will be seen from the foregoing that with the independent and sequential orientation of the sets of strands, the difficulties inherent in simultaneous orientation are decreased. For example, there is no friction problem with respect to a mandrel, thus giving rise to additional problems of uneven distribution of heat and uneven orientation with accompanying uneven openings in the net and irregular strand thickness. Other advantages include the ease with which the various temperatures, speeds, degree of stretch and orientation, and the like may be controlled.

Most importantly, it has been found that the heat stability of such net, whether only slightly heat-set or extensively heat-set, is more uniform. That is to say that the degree of shrinkage upon any subsequent application of heat to the net is more nearly the same along each of the sets of strands than is true when such orientation is accomplished over a mandrel with all sets of strands being oriented simultaneously. For example, it has been found that net in which the sets of strands are arranged at substantially a right angle is oriented by orienting all sets simultaneously will, whether heat-set or not, tend to shrink more upon subsequent application of heat along the set of strands which were extruded longitudinally in the machine direction than along the strands which were extruded transverse to the machine direction. When such a net is oriented according to the present invention, however, appreciably less difference in heat-shrink characteristics are noticed between the two sets of strands, irrespective of whether the net is appreciably heat-set or not. This improvement in uniformity of heat-shrink characteristics is significant and important particularly since such nets are commonly used either in laminations or in other combinations with sheet-like woven or felted materials wherein such heat-shrinkage is sometimes induced as a deleterious side effect of the required subsequent manufacturing techniques. These techniques frequently require application of heat for various purposes in no way connected with the manufacture of the net per se and the heat-shrink characteristics of the net become critical to the stability and quality of the final product so produced.

It is not known, nor need it be known, exactly why orientation by the method of this invention should have this unusual and advantageous result in the final product as compared with simultaneous orientation of the two sets of strands. Indeed, it was to be expected that there would be a greater differential in heat-shrink characteristics since the strands are not orientated simultaneously and, as such, are not necessarily oriented under the same conditions. It was to be expected that slight differences in orientation environment, such as temperatures, speed of pulling, means of pulling, degree of pulling, and the like, would create appreciable differences in heat-shrink reaction in the different sets of strands when said sets were separately oriented. It was found, however, that the heat-shrink characteristics are more uniform in the two directions when the sets are separately oriented.

In retrospect, it is speculated that the improved uniformity of heat-shrink characteristics between the sets of strands and the generally increased heat stability may be related in some way to the heating without stretching of the strands 90 in the oven during stretching of the strands 80, though there may well be other factors that are not known which contribute or control this characteristic.

It has also been found that if the conditions of orienting are carried out in such manner as to produce any visibly noticeable "webbing" in the crotch of a joint 100 formed by the intersection of the strands 80 and 90, such net will exhibit considerably decreased strength. This phenomenon, apparently, operates independently of the heat stability characteristic referred to above.

Figure 3:
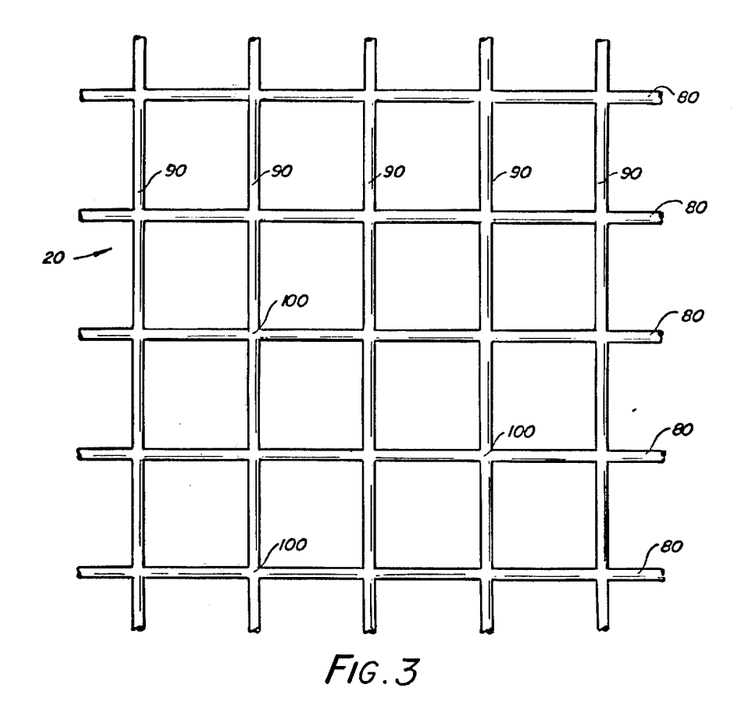
FIG. 3 is an enlarged plan view of the net of the invention.
Figures 4, 6:
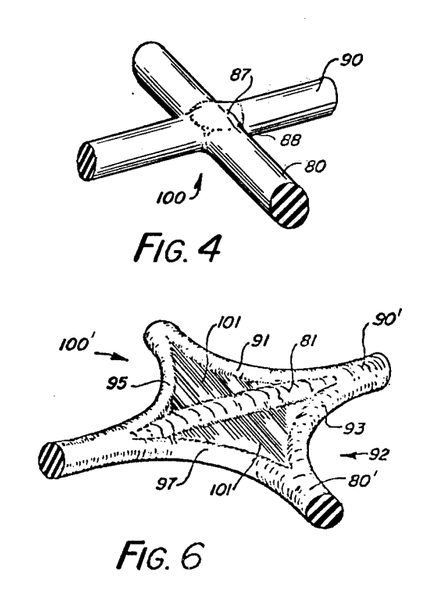

In FIG. 3 the net 20 is shown enlarged, as compared with FIG. 2. The joint 100 formed at the intersections of the strands 80 and 90 is, preferably, free of such webbing as indicated in still further enlarged form in FIG. 4. In FIG. 4, a single joint 100 at the intersection of a strand 80 and a strand 90 is shown as having a crotch 88 that is essentially totally free of any webbing. The joint has a slight bulge or excess of plastic as indicated at 87. In FIG. 6 a similar joint 100' is shown at the intersection of a strand 80' and a strand 90'. The joint 100', however, is shown as having a clearly defined webbing 92 as evidenced by the existence of membrane 101 and the excess of material 87 has changed form or disappeared as indicated hereinafter.

It will be noted that one of the strands (strand 90') has become forked or branched at the joint into branches 91, 93, 95, and 97 which are, in effect, also branches of the strand 80'. The membrane of film 101 is divided by the centrally located strand 81 which is a continuation of strand 90' but of somewhat lesser diameter since it has supplied most of the material used in forming the membrane 101 which has also received material from the bulge 87. The bulge 87 has also in part become the strand 81. The strand 81 may run in the other direction as a continuation of strand 80' or may exist in both directions if the orienting conditions of temperature, speed, and the like are appropriately different.

Figure 5:
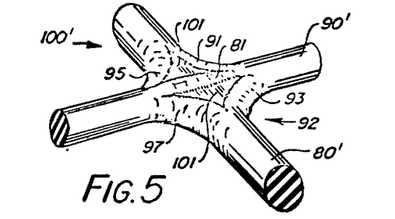

FIG. 5 shows the same or similar joint to joint 100' of FIG. 6 in which the membrane 101 is just barely visibly discernible thus indicating the presence of deleterious webbing.

Figure 7:
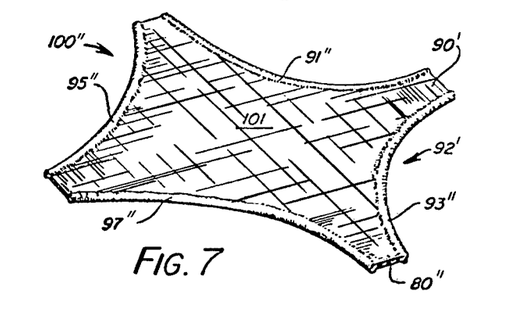

FIG. 7 shows a joint 100" with extreme webbing in which the webbing 92" at the juncture of the strands 90" and 80" has extended to the point where the strands 80" and 90" are split into separate strands as extensions or branches 91", 93", 95", and 97". The membrane 101" now extends through the strands 80" and 90" and the central strand remnant 81 has totally disappeared to provide the film of membrane 101". If the orientation is carried out under improper conditions, the webbing can become so severe as to nearly completely close the openings of the net.

It has been found that the best measure of the degree of webbing is the human eye, in that as soon as there is a visibly discernible membrane 101, such as shown in FIG. 5, the net will begin to deteriorate markedly in strength. As the webbing increases in severity as shown, for example, in FIGS. 6 and 7, the net will exhibit still further reduction in strength, although the relationship between degree of webbing and strength is not necessarily a straight-line relationship. There is probably some webbing present at some stage between the completely clean joint construction of FIG. 4 and the barely visibly discernible membrane 101 of the joint 100' shown in FIG. 5; however, until the membrane becomes visibly discernible, there is no appreciable decrease in strength.

Accordingly, the orientation of the net in the manner described above must be carried out under such conditions of temperature, time, and speed of operation as to maintain the joints 100 free of any visibly discernible membrane. Unfortunately, the particular times, temperatures, and speeds of operation can only be determined empirically for any given net, since the conditions vary with the strand count, strand size, particular plastic used in the extrusion, and perhaps other variables not clearly understood or known. This significance of the deterioration in strength due to webbing and its criticality with respect to seriously affecting strength at the time a membrane becomes visibly discernible has not previously been recognized. Indeed, it has been thought that some webbing was desirable as a sort of "brace" across the joint. Applicant has discovered, on the other hand, that such is not the case.

It is to be understood that while a specific embodiment has been described above and particular reference has been made to specific nets, various modifications within the spirit of the invention and the scope of the appended claims are contemplated.

I claim:

1. An extruded oriented polymeric plastics sheet of net formed by extruding two sets of spaced individual strands in which a first set of spaced individual strands is extruded in a circular arrangement and in which the spaced individual extruded strands of the second set cross the spaced individual extruded strands of said first set at an angle to form a tubular net which is slit to form a sheet in which individual strands of one set of strands are aligned substantially parallel to the length of the sheet and the individual strands of the other set of strands are aligned at substantially a right angle to the said individual strands of said one set of strands, and the strands of one set of strands in said sheet having been molecularly oriented by first only stretching said one set of strands in a first direction along their length and the strands of the other set of strands in said sheet having been molecularly oriented in a subsequent step by stretching only the strands of said other set in a second direction along their length, said sets of strands being heated during stretching, the net is subsequently cooled and wherein the joints at the crossing formed by the strands of one set crossing the strands of another set is substantially free of any visibly discernible webbing in the crotches of the joints.

2. A method of orienting the molecules of a sheet of thermoplastic polymeric plastics net which comprises extruding two sets of spaced individual strands of other set of strands are aligned at substantially a right angle to the said individual strands of said one set of strands and thereafter, in a subsequent step, heating said net, stretching first only the strands of one set of strands along their length while the net is heated, and subsequently, after the completion of the stretching the strands of said one set, stretching in a second direction only the strands of the other set of strands along their length while the net is heated, and cooling the net, and wherein the conditions of stretching are controlled to avoid the formation of any visibly discernible membrane in the crotches of the joints.

3. The method of claim 2 in which each set of strands after stretching is heated to a temperature higher than the temperature at the time of stretching to heat set the set of strands.

4. The method of claim 2 wherein the net is cooled after the stretching of the strands of the one set and before the stretching of the strands of the other set.

5. The method of claim 2 wherein one set of strands is extruded essentially parallel to the direction of extrusion of the net and the other set of strands is extruded essentially at a right angle to the direction of extrusion of the net.

6. A method of orienting the molecules of a sheet of thermoplastic polymeric plastics net which comprises extruding two sets of spaced individual strands of plastic in a circular arrangement in which the spaced individual strands of one set cross the spaced individual strands of the other set at an angle to form integral joints and a tubular net, slitting the tubular net to form a sheet wherein the individual strands of one set of strands are aligned substantially parallel to the length of the sheet and the individual strands of the plastic in a circular arrangement in which the spaced individual strands of one set cross the spaced individual strands of the other set at an angle to form integral joints and a tubular net, slitting the tubular net to form a sheet wherein the individual strands of one set of strands are aligned substantially parallel to the length of the sheet and the individual strands of the other set of strands are aligned at substantially a right angle to the said individual strands of said one set of strands and thereafter, in a subsequent step, heating said net, stretching first only the strands of one set of strands along their length while the net is heated, and subsequently, after the completion of the stretching the strands of said one set, stretching in a second direction only the strands of the other set of strands along their length while the net is heated, and cooling the net.

* * * * *

UNITED STATES PATENT AND TRADEMARK OFFICE
CERTIFICATE OF CORRECTION

PATENT NO. : 4,152,479            Page 1 of 3
DATED      : May 1, 1979
INVENTOR(S) : Ronald L. Larsen It is certified that error appears in the above—identified patent and that said Letters Patent is hereby corrected as shown below:

Claims 2 and 6 should be deleted to appear as per attached claims 2 and 6.

Signed and Sealed this

Eighteenth Day of November 1980

[SEAL]

Attest:

SIDNEY A. DIAMOND

Attesting Officer      Commissioner of Patents and Trademarks 2. A method of orienting the molecules of a sheet of thermoplastic polymeric plastics net which comprises extruding two sets of spaced individual strands of plastic in a circular arrangement in which the spaced individual strands of one set cross the spaced individual strands of the other set at an angle to form integral joints and a tubular net, slitting the tubular net to form a sheet wherein the individual strands of one set of strands are aligned substantially parallel to the length of the sheet and the individual strands of the other set of strands are aligned at substantially a right angle to the said individual strands of said one set of strands and thereafter, in a subsequent step, heating said net, stretching first only the strands of one set of strands along their length while the net is heated, and subsequently, after the completion of the stretching the strands of said one set, stretching in a second direction only the strands of the other set of strands along their length while the net is heated, and cooling the net.

6. A method of orienting the molecules of a sheet of thermoplastic polymeric plastics net which comprises extruding two sets of spaced individual strands of plastic in a circular arrangement in which the spaced individual strands of one set cross the spaced individual strands of the other set at an angle to form integral joints and a tubular net, slitting the tubular net to form a sheet wherein the individual strands of one set of strands are aligned substantially parallel to the length of the sheet and the individual strands of the other set of strands are aligned at substantially a right angle to the said individual strands of said one set of strands and thereafter, in a subsequent step, heating said net, stretching first only the strands of one set of strands along their length while the net is heated, and subsequently, after the completion of the stretching the strands of said one set, stretching in a second direction only the strands of the other set of strands along their length while the net is heated, and cooling the net, and wherein the conditions of stretching are controlled to avoid the formation of any visibly discernible membrane in the crotches of the joints.